Dec. 26, 1967    R. S. LEERS    3,360,152
PLASTIC HOUSINGS
Filed Aug. 27, 1965    2 Sheets-Sheet 1

INVENTOR.
ROBERT S. LEERS
BY Kenwood Ross
ATTORNEY.

Dec. 26, 1967 R. S. LEERS 3,360,152
PLASTIC HOUSINGS
Filed Aug. 27, 1965 2 Sheets-Sheet 2
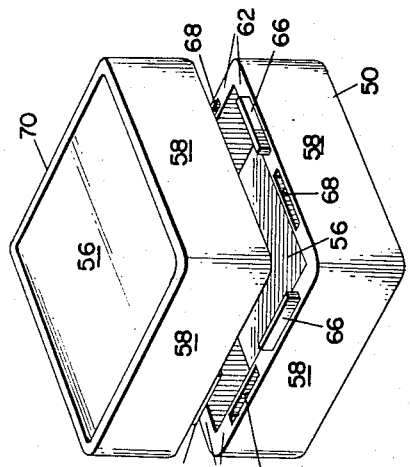
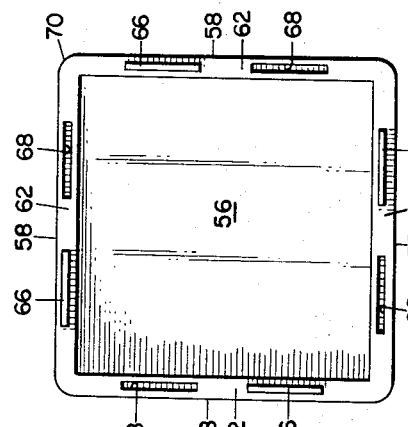
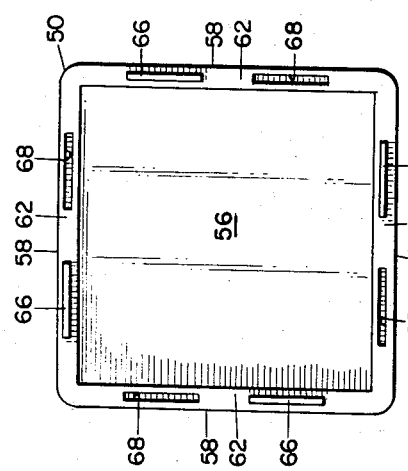
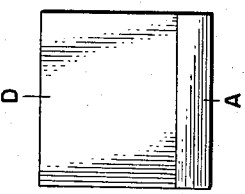
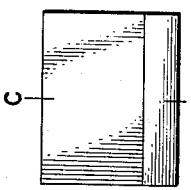
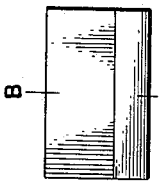
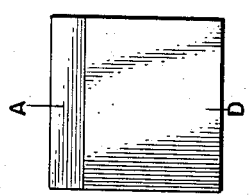
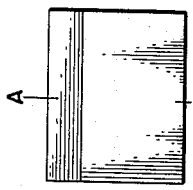
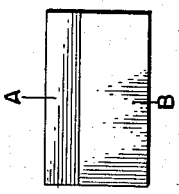
INVENTOR.
ROBERT S. LEERS
BY Kenwood Ross
ATTORNEY.

United States Patent Office 3,360,152
Patented Dec. 26, 1967

3,360,152
PLASTIC HOUSINGS
Robert S. Leers, 48 Englewood Road,
Longmeadow, Mass. 01106
Filed Aug. 27, 1965, Ser. No. 483,087
1 Claim. (Cl. 220—4)

ABSTRACT OF THE DISCLOSURE

A container comprising two identical, separable, flexible, resilient molded plastic trays fitting together in mutual telescopic relation, each tray having a continuous main wall and pairs of side and end walls at right angles thereto, the side and end walls of said trays being in aligned abutting relation, the ends of said side and end walls being provided with tongues and grooves in aligned abutting relation with the corresponding tongues and grooves of the complementary tray when the trays are fitted together for locking said trays together, said tongues and grooves being invertibly complementary on either side of perpendicular center lines through said trays diagonally across the corners of said trays whereby said tongues and grooves interlock when one of said trays is rotated relative to the other about their common vertical central axis to any one of four positions 90 degrees apart.

---

This invention relates to improvements in containers or receptacles, and more particularly to that type of container or receptacle part, called a "tray," which is adapted to form a container or receptacle by coacting with an upside-down similar container or receptacle part, also called a "tray."

More particularly, it relates to containers or receptacles constituted by pairs of identical or non-identical separable trays which may be made from a single mold and which, when assembled together, as pairs, in the manner of their normal use, will releasably interlock at portions of their interengaging or abutting surfaces so as to form composite receptacle structures.

The two trays of a pair forming the receptacle hereof are configured so as to be in telescopic relation around their confronting perimeters, the telescoping elements of one being interengageable with the telescoping elements of the other.

A jointure is provided, extending around the outer perimeter of each tray, with the confronting perimeters of the trays of a pair meeting in a smooth junction and with the trays being held together by the friction of the telescoping elements in the form of complemental tongues and grooves or nibs and recesses formed in each of the mutually-abutting surfaces.

A primary object of the invention is to provide a two-part container or receptacle possessive of novel interlocking features to insure against unwanted separation of the parts as by any longitudinal or lateral displacement of one tray relative to the other.

Another object is to teach a system allowing the production of a two-part container or receptacle, with the component parts thereof being identical or non-identical while yet being made from a single mold, thereby effecting significant production economies. While the two parts or trays will be identical as respects their lengths and widths and hence their mating faces, it is to be stressed that they may be either identical or non-identical as respects their depths or heights, notwithstanding their being made from the aforesaid single mold, the design thereof being such as to allow the production of equal length and equal width trays which may be readily modified to provide trays of different depths or heights. Such allows part forming in a relatively inexpensive manner, and with a minimum number of tools or dies being required therefor, all so as to contribute to rapid quantity manufacture.

Another object hereof is to provide a container or receptacle made up of a tray serving as a base component, and a tray serving as a cover component engageable therewith, with means incorporated into each of said trays for reliably precluding accidental displacement of one relative to the other.

Another object is to provide a novel article-holding construction which comprises a pair of separable molded parts or sections which are identical or nonidentical parts or sections having novel means for detachably securing the separable parts or trays or sections together, the trays or sections having smooth interfitting wall formations, a feature of design which makes the characteristics of the composite structure inconspicuous to and non-observable by the average eye.

Another object is to provide features which will reliably insure against the slippage of one tray such as a base component from its nesting relationship with another tray such as a cover component, which will permit ready closure of the construction when and as desired and ready access to the interior thereof when and as desired.

Still another of the objects hereof is to provide a tray adapted to form receptacles with similar trays, with this tray having rigidly connected receptacle-forming parts or elements.

A further object is to provide a tray characterized by its structural simplicity, multiplicity of functional advantages, and ease of assembly with similar trays in receptacle-forming positions.

Other objects and advantages of this invention will be apparent from the accompanying drawings and description and the essential features will be set forth in the appended claims.

In the drawings:

FIG. 5 is an inverted bottom plan view of a third form of tray;

FIG. 6 is a top plan view of a fourth form of tray;

FIG. 7 is an exploded isometric view of the third and fourth trays of FIGS. 5 and 6 about to assume a receptacle-forming position; and FIGS. 8–14 semidiagrammatically illustrate various combinations of the items illustrated in or referred to in connection with FIGS. 1–4 and FIGS. 5–7 in receptacle-forming position.

Whenever, in the specification and claim, the container or receptacle parts are referred to as "trays" or "half parts," it is intended that these terms include crates, boxes, baskets, skids, pallets, flats and similar article-carrying devices which may form containers or receptacles and which have at least one open side.

Whenever, in the specification and claim, the terms "container" or "receptacle" are used, they are intended to define a structure composed of two such trays, one upside down with respect to the other, with the open sides in confronting relationship as to each other.

The words "similar trays" are intended to include all trays having identical receptacle-forming parts engaging in receptacle forming position whether the vertical heights of the trays are the same or are different. "Like trays" would be "similar trays" with each tray having the same vertical height. Since the term "similar trays" includes "like trays," the description will use the term "similar trays" whenever possible.

Before the trays and receptacles here illustrated are specifically described, it is to be understood that the invention involved is not limited to the structural details or arrangements of parts here shown since trays and receptacles embodying the invention may take various forms.

It is also to be understood that the phraseology or terminology herein employed is for purposes of description and not of limitation since the scope of the present invention is denoted by the appended claim.

Figure 1:
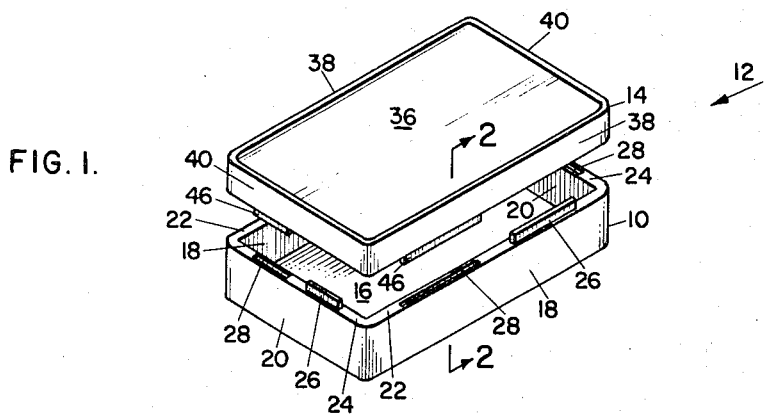
FIG. 1 is an exploded view in perspective of a pair of trays about to assume a receptacle-forming position.
Figure 2:
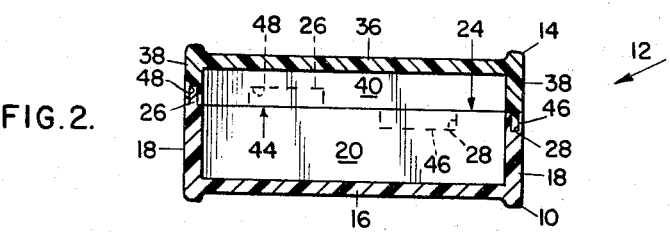
FIG. 2 is a sectional view on the line 2—2 of FIG. 1 showing the pair of trays in receptacle-forming position.
Figures 3, 4:
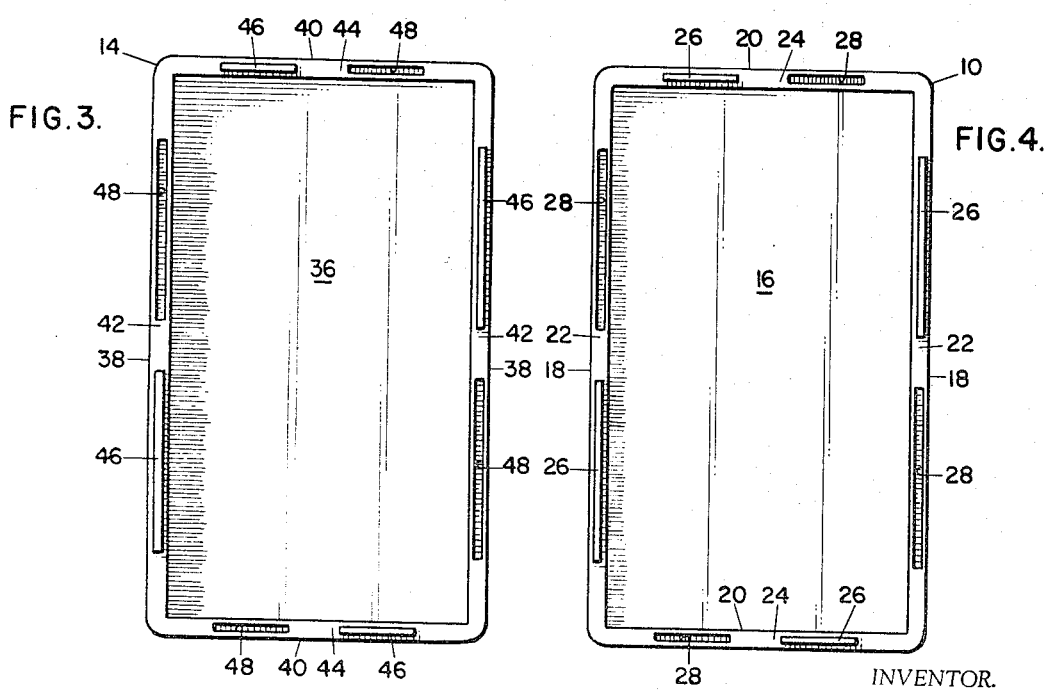
FIG. 3 is an inverted bottom plan view of the first tray shown in FIGS. 1 and 2.
FIG. 4 is a top plan view of the second tray shown in FIGS. 1 and 2.

The first tray form is shown in FIGS. 1, 2 and 4. This tray 10 is constructed for forming a receptacle 12, shown in FIGS. 1 and 2, by coacting with an upside down similar tray 14 shown in FIGS. 1, 2 and 3.

Each tray 10 and tray 14 may be made in many different ways and by many different materials. Advantageously and preferentially though not obligatorily, it is formed from a clear transparent thermo-plastic or thermo-setting material, as for example styrene, so that the box contents will be visible for ready display or identification purposes, while at the same time, insuring protection from contamination by dust, dirt and other deleterious substances. Plastic offers the further advantage that the sides may be flexed as desired to insure smoother ingress into and egress from the provided projection-receiving portions.

Tray 10 has rigidly interconnected together a rectangular base part 16 for load support, two side parts 18 and two side parts 20 rigidly connected with base part 16 in right angular relationship therewith, and in right angular relationship with each other and located on and projecting upwardly from one side of base port 16, which side parts 18 and 20 define four receptacle-forming edges 22 and 22 and 24 and 24 respectively, located generally in a plane coplanar with base part 16. These edges are coextensive with the two pairs of side parts and have projection and projection-receiving portions 26 and 28 respectively.

Receptacle 12 is formed by two trays, a right side up bottom tray 10 and an upside-down similar tray 14, coacting with edges 22 and 24 and 42 and 44 mutually engaged. Projection portions 46 are located in projection-receiving portions 28 and receptacle forming side parts 18 and 38 and side parts 20 and 40 are vertically aligned to form the completely enclosed receptacle 12.

The structure is such that the base part of one of the trays may serve interchangeably as the bottom wall or as the upper wall of the composite receptacle.

The outer faces of the receptacle are preferably smooth, even at all outside portions of the joint between the sections where, the sections are in alignment with each other, so as to define no offsetting at the line of juncture.

Attention is here called to the facts that the ray is free of any undercut parts so that it can thus be readily formed in a simple mold, or by other practical means and further that the side parts and base part are such as to allow in a formed receptacle a compactness of composite structure for storage purposes.

Whereas tray 10 is a right side up bottom tray, tray 14 is an upside-down similar tray having rigidly interconnected together a rectangular base part 36, two side parts 38 and two side parts 40 located on and projecting downwardly from one side of base part 36, which side parts 38 and 40 define four receptacle-forming edges 42 and 44 respectively located generally in a plane coplanar with base part 36. These edges have projection and projection-receiving portions 46 and 48 respectively.

As dramatized in FIGS. 3 and 4, the arrangement of the projection portions and projection-receiving portions is the same for both of the trays 10 and 14, said trays being formed from the same mold.

Accordingly, when tray 14 is inverted so as to assume receptacle-forming position, its projection portions and projection-receiving portions are arranged as reversed mirror images.

Such arrangement allows the interengagement of tray 14 upon tray 10 regardless of which end of tray 14 is brought to engage one particular end of tray 10.

A top tray interlocks with the lower tray in either one of two positions rotated about a vertical axis running through the centers of the base parts, these two positions being disposed 180 degrees apart. The rectangular shape of the trays inherently limits them to two relatively rotated positions 180 degrees apart.

In other words, the outermost free surfaces of the side parts of a tray distantly of its base part are coplanar to define a narrow band extending continuously around the tray and provided therealong with a plurality of interlocking elements which are complemental to the interlocking elements at the narrow band of the other tray, wherefore the trays may be releasably interengaged to form the composite structure. These interlocking elements in the case of each of the similar trays comprise a plurality of strategically-located projection portions or tongues provided at certain positions along or locations on the narrow band and a plurality of projection-receiving portions or grooves provided at other positions along or locations on the band.

The tongues may be in the form of longitudinal, semi-circular raised portions so formed that their topmost or uppermost surfaces are disposed in a horizontal plane upwardly of the plane of the outermost free surface of the respective side part of the component and the grooves may be in the form of longitudinal, semi-circular recesses so formed that their bottom-most or lower-most surfaces are disposed in a horizontal plane downwardly of the plane of the outermost free surface of the respective side part of the component. The tongues and grooves are so dimensioned that a tongue of one component will be frictionally nestable within a groove of the other component.

In the embodiment illustrated, I have shown, in FIGS. 1-4, one of the trays as being provided with a tongue and groove on each of the side parts. The number, size and location of the tongues and grooves may be varied to meet any particular box making requirements.

When a pair of trays are brought into confrontation, as shown in FIG. 1, the tongues and grooves of one tray will interact with the tongues and grooves of the other cooperating tray, all thereby forming an interlock such as to prevent not only lateral displacement of the trays relative to each other but also any disengagement of the trays relative to each other.

When assembled, the two sections assume an opposed, or reversed relationship as to each other so that the tongue portion of the side part of one section is in telescopic relationship with the groove portion of the mating side part of the other section.

Thus, the primary feature of the invention will be observed to be in tongues and grooves so provided on one of the elements and tongues and grooves so provided on the other of the elements that when the elements are assembled in a pair, as shown in FIG. 1, each tongue or groove of one of the respective elements will interact with a tongue or groove of the cooperating element in superposed relation therewith, all to form a plurality of interlocks sufficient to hold the elements in tight article-containing position as to each other.

By the novelty of placing tongues and grooves on each of the receptacles, I am enabled to produce the two mating parts of a single article by means of a single mold, thus effecting great economy in the cost of equipment necessary to produce the composite article, the advantage of which will be readily appreciated by anyone familiar with mold equipment costs.

The joining and separation of the trays or half-parts will be readily apparent when it is understood that all side parts will have a sufficient flexibility so that, by a slight inward flexing of one or more of the walls, the half-parts may be joined or separated. The resiliency of the side parts of the container sections, therefore, enable the container to be readily assembled or disassembled at will, the frictional engagement between the close-fitting telescoping complemental portions serving to secure the sections together.

In the showing, trays 10 and 14 assume an orientation and cooperantly form the container. It should be understood, however, that the container may have any orientation, the references to "top" and "bottom" being here used merely for purposes of simplifying the description and the claiming.

While the assembled receptacle is shown as being of generally rectangular shape, it will be understood that such is submitted merely as a preferred exemplification and that it may be of other desired shape, all without departing from the spirit and scope of the invention, it being obvious to those skilled in the art to which the invention appertains that the invention may be incorporated in any of several different constructions.

In the modified form of FIGS. 5–7, a square arrangement is shown.

Tray 50 comprises a square base part 56 and four side parts 58 rigidly connected with base part 56 in right angular relationship therewith and projecting upwardly from one side of the base part, with the side parts defining four receptacle-forming edges 62 located in a plane coplanar with base part 56 and having projection and projection-receiving portions 66 and 68 respectively.

Tray 70 is identical therewith.

Now, it will be apparent that two trays 50 and 70, one right side up and the other upside down, will form, by interengagement of their receptacle-forming parts, a receptacle with the side parts of the trays being vertically aligned. It will be noted that the receptacle will be formed with the upside down, top tray 70 in any of four 90 degree displaced positions around its vertical center axis because of the construction of the projection portions 66 and projection-receiving portions 68 so that four different receptacle-forming positions are possible. Hence, it is possible to form the receptacle in any of these four 90 degree displaced positions instead of in only two positions as in the FIGS. 1–4 form. This is true because each of the receptacle forming edges have both a projection portion and a projection-receiving portion and because the side parts are of equal length.

To form the receptacle, a right side up lower tray and an upside down upper tray are placed in parallel and vertically spaced apart planes and in vertical alignment. Then, upper tray 70 is rotationally displaced clockwise or counterclockwise about its vertical axis until the receptacle forming side parts are vertically aligned to form the receptacle in the receptacle-forming position. Then, each tray has its tongues detachably engaged in the related grooves on the other tray. The base parts each have an outline of a square so that these similar trays may be engaged in any of four, 90 degree displaced positions about the vertical axis to form a receptacle.

FIGS. 8–14 illustrate in a semi-diagrammatic manner some various possible uses and combinations of the trays illustrated in FIGS. 1–4 and 5–7. Speaking of the trays generically, similar trays of varying depths may be interengaged as shown.

In FIG. 8, a receptacle is formed from two like or identical trays A and A. However, it will be apparent that a plurality of similar trays, such as trays of different depth, will provide the same advantages. Each of these similar trays will have identical receptacle-forming support parts engaging in the receptacle forming position. However, such trays may be of smaller depth, such as three inches, while other trays will be exactly identical except of greater depth, such as four inches so that these are similar trays. Since all parts are identical, a receptacle can be formed from two three inch depth trays, or from one three inch depth and one four inch depth tray. Thus, with a plurality of trays with three different receptacle vertical dimensions, that is with three different tray depths, it is possible to get six different receptacle vertical dimensions; with four different tray depths, it is possible to get ten different receptacle depth dimensions, etc., etc.

FIG. 9 shows a substantially deeper tray B having placed thereon a tray A in receptacle forming position. In the latter instance, tray A affords a suitable cover for the substantially deeper tray B.

FIG. 10 shows a still deeper tray C having placed thereon a tray A in receptacle-forming position.

FIG. 11 shows an even deeper tray D having placed thereon a tray A in receptacle forming position.

FIG. 12 shows the tray A of FIG. 8 as the lower tray of a receptacle completed by the tray B of FIG. 9 as the top tray.

FIG. 13 shows the tray A as the lower tray of a receptacle completed by the tray C of FIG. 10 as the top tray.

FIG. 14 shows the tray A as the lower tray of a receptacle completed by the tray D of FIG. 11 as the top tray.

In other words, by virtue of such a single mold system, I am able to produce equal length and equal width trays of any practical depth, thereby providing for a virtually endless variety of container or receptacle sizes by a simple expedient which permits such a provision. By using different height inserts for purposes of governing the depth of the trays formed with the mold, different sizes of trays are readily attainable. For purposes of exemplification, the manufacturer may employ a ½" high insert to provide one tray and may use an identical tray as the other component of his formed container or receptacle. Contrariwise, in lieu thereof, he may, by employing a ¼" high insert provide a tray which allows the forming of a complete container or receptacle which is ¾" high, or he may, by employing a ¾" high insert, provide a tray which allows the forming of a complete container or receptacle which is 1¼" high, and so on, ad infinitum. He may form a plurality of sizes of containers or receptacles, say 21 in number, by combinations of trays all made from the single mold allowing the production of parts of six different sizes here bearing different identifying symbols for purposes of illustration, such as Box:
    1 comprised of trays of sizes A and A
    2 comprised of trays of sizes B and B
    3 comprised of trays of sizes C and C
    4 comprised of trays of sizes D and D
    5 comprised of trays of sizes E and E
    6 comprised of trays of sizes F and F
    7 comprised of trays of sizes A and B
    8 comprised of trays of sizes A and C
    9 comprised of trays of sizes A and D
    10 comprised of rtays of sizes A and E
    11 comprised of trays of sizes A and F
    12 comprised of trays of sizes B andC
    13 comprised of trays of sizes B and D
    14 comprised of trays of sizes B and E
    15 comprised of trays of sizes B and F
    16 comprised of trays of sizes C and D
    17 comprised of trays of sizes C and E
    18 comprised of trays of sizes C and F
    19 comprised of trays of sizes D and E
    20 comprised of trays of sizes D and F
    21 comprised of trays of sizes E and F Thus I provide a means for making a virtually endless variety of box sizes by the simple expedient of using inserts of different heights or the like in the mold, thereby governing the heights of the half-parts produced by the mold.

By placing a ½ inch high insert in the mold used to form one of the half-portions, I may make the other co-operating half-portion of the same size. Or I may then replace the ½ inch high inserts with an insert ¼ inch in height so to produce a part which with the first formed part will produce a box having an overall height of ¾ inch. If a ½ inch insert were placed in the mold for each half-section, a formed box of one inch in height would be produced, and so on. Since the possible combinations of inserts are endless, the box sizes capable of formation are practically endless.

These half-portions, while allowed various depths, will be identical in all other respects, that is as to width and length and configuration at the narrow end so that any two thereof can be assembled together to form a unitary container of a predetermined height.

From the foregoing description it will be clear that the hereinabove objects and advantages of this invention have been achieved; however, changes and modifications may be made without departing from the spirit and scope of the sub-joined claim.

Having described my invention, what I claim is:

A container comprising two identical, separable, flexible, resilient molded plastic trays fitting together in mutual telescopic relation, each tray having a continuous main wall and pairs of side and end walls at right angles thereto, the side and end walls of said trays being in aligned abutting relation, the ends of said side and end walls being provided with tongues and grooves in aligned abutting relation with the corresponding tongues and grooves of the complementary tray when the trays are fitted together for locking said trays together, said tongues and grooves being invertibly complementary on either side of perpendicular center lines through said trays diagonally across the corners of said trays whereby said tongues and grooves interlock when one of said trays is rotated relative to the other about their common vertical central axis to any one of four positions 90 degrees apart.

References Cited

UNITED STATES PATENTS

| 3,149,747 | 9/1964 | Burgess | 220—60 |
| 3,252,568 | 5/1966 | Steidinger | 220—4 X |

FOREIGN PATENTS

| 1,027,889 | 4/1966 | Great Britain. |

THERON E. CONDON, *Primary Examiner.*

G. T. HALL, *Assistant Examiner.*